United States Patent
Dong et al.

(10) Patent No.: US 12,398,276 B2
(45) Date of Patent: Aug. 26, 2025

(54) COMPOSITE COATING AND PREPARATION METHOD AND USE THEREOF

(71) Applicant: ANHUI UNIVERSITY OF SCIENCE AND TECHNOLOGY, Huainan (CN)

(72) Inventors: Xiang Dong, Huainan (CN); Le Xie, Huainan (CN); Delong Li, Huainan (CN)

(*) Notice: Subject to any disclaimer, the term of this patent is extended or adjusted under 35 U.S.C. 154(b) by 0 days.

(21) Appl. No.: 18/010,153

(22) PCT Filed: Sep. 21, 2022

(86) PCT No.: PCT/CN2022/120063
§ 371 (c)(1),
(2) Date: Dec. 13, 2022

(87) PCT Pub. No.: WO2024/040661
PCT Pub. Date: Feb. 29, 2024

(65) Prior Publication Data
US 2025/0179311 A1    Jun. 5, 2025

(30) Foreign Application Priority Data
Aug. 22, 2022    (CN) .......................... 202211005480.1

(51) Int. Cl.
*C09D 5/18* (2006.01)
*C08J 7/04* (2020.01)
(Continued)

(52) U.S. Cl.
CPC ................ *C09D 5/18* (2013.01); *C08J 7/042* (2013.01); *C08J 7/05* (2020.01); *C08K 5/0066* (2013.01);
(Continued)

(58) Field of Classification Search
CPC . C09D 5/18; C09D 7/63; C09D 5/002; C09D 105/08; C09D 133/02;
(Continued)

(56) References Cited

FOREIGN PATENT DOCUMENTS

| CN | 113831596 A | * | 12/2021 |
| CN | 113956723 A | * | 1/2022 |

* cited by examiner

*Primary Examiner* — John D Freeman
(74) *Attorney, Agent, or Firm* — Sandy Lipkin

(57) ABSTRACT

The present disclosure belongs to the technical field of flame-retardant polymers, and in particular, to a composite coating and a preparation method and use thereof. The present disclosure provides a composite coating, including n unit coatings arranged in layers, where $n \geq 1$. Each of the unit coatings includes a first coating and a second coating arranged in layers in sequence. The first coating and the second coating both include a water-soluble polymer compound. The water-soluble polymer compound includes an electropositive water-soluble polymer compound or an electronegative water-soluble polymer compound. The water-soluble polymer compounds in the first coating and the second coating have opposite electrical properties. The first coating and/or the second coating further include/includes $M(OH)(OCH_3)$, where the M includes one or more selected from the group consisting of Co, Ni, Fe, Mg, Al, and Zn. The composite coating provided by the present disclosure has excellent flame retardancy.

19 Claims, 12 Drawing Sheets

(51) Int. Cl.
  *C08J 7/05* (2020.01)
  *C08K 5/00* (2006.01)
  *C08K 5/057* (2006.01)
  *C09D 7/63* (2018.01)
  C09D 5/00 (2006.01)
  C09D 105/08 (2006.01)
  C09D 133/02 (2006.01)
  C09D 179/02 (2006.01)
  C09D 197/00 (2006.01)

(52) U.S. Cl.
  CPC ............... *C08K 5/057* (2013.01); *C09D 7/63* (2018.01); *C08J 2405/08* (2013.01); *C09D 5/002* (2013.01); *C09D 105/08* (2013.01); *C09D 133/02* (2013.01); *C09D 179/02* (2013.01); *C09D 197/005* (2013.01)

(58) Field of Classification Search
  CPC .... C09D 179/02; C09D 197/005; C08J 7/042; C08J 7/05; C08J 2405/08; C08K 5/0066; C08K 5/057
  See application file for complete search history.

COMPOSITE COATING AND PREPARATION METHOD AND USE THEREOF

CROSS REFERENCE TO RELATED APPLICATION

The present application claims priority to International Patent Application No. PCT/CN2022/120063 filed Sep. 21, 2022 which claims priority to Chinese Patent Application No. CN202211005480.1 filed with the China National Intellectual Property Administration (CNIPA) on Aug. 22, 2022 and entitled "COMPOSITE COATING AND PREPARATION METHOD AND USE THEREOF", which is incorporated herein by reference in its entirety.

TECHNICAL FIELD

The present disclosure belongs to the technical field of flame-retardant polymers, and particularly relates to a composite coating and a preparation method and use thereof.

BACKGROUND

The traditional method to improve the flame retardancy of polymers mainly adds flame retardants to the polymers. Common flame retardants include halogen containing flame retardants and intumescent flame retardants. The halogen containing flame retardants are harmful to the environment and human body due to the presence of halogen elements. In addition, despite the advantages of environmental protection and smoke suppression, the intumescent flame retardants with a high addition amount usually lead to deterioration of mechanical properties of the polymers.

Layer by layer self-assembly is a simple and multifunctional surface modification method, which is mainly based on the principle of layer by layer alternate deposition. Through the strong interaction (such as chemical bond) or weak interaction (such as electrostatic attraction, hydrogen bond, and coordination bond) between the target compound and the functional groups on the surface of the substrate in the polyelectrolyte solution, a multilayered film structure is formed spontaneously and continuously on the substrate. Such a method can control the composition, structure and thickness of the coating at the molecular level, and has the characteristics of simple operation, stable performance, high efficiency and easy functionalization. The application of this technology to the flame-retardant coating on the surface of polymers can overcome the defect that the mechanical properties of the polymers deteriorate due to the heavy addition of the intumescent flame retardant.

The Chinese patent with the publication No. CN113956723A discloses a layer by layer self-assembled flame-retardant coating, which uses a biopolymer polyelectrolyte as the construction body of the coating and graphene oxide or montmorillonite with a thermal barrier function as the flame-retardant synergist. However, the above flame-retardant coating still has the defect of poor flame retardancy.

SUMMARY

An objective of the present disclosure is to provide a composite coating and a preparation method and use thereof. The composite coating provided by the present disclosure has excellent flame retardancy.

To achieve the above objective, the present disclosure provides the following technical solutions:

The present disclosure provides a composite coating, including n unit coatings arranged in layers, where n≥1. Each of the unit coatings includes a first coating and a second coating arranged in layers in sequence.

The first coating and the second coating both include a water-soluble polymer compound.

The water-soluble polymer compound includes an electropositive water-soluble polymer compound or an electronegative water-soluble polymer compound.

The water-soluble polymer compounds in the first coating and the second coating have opposite electrical properties.

The first coating and/or the second coating further include/includes M(OH)(OCH3), where the M includes one or more selected from the group consisting of Co, Ni, Fe, Mg, Al, and Zn.

Preferably, the electropositive water-soluble polymer compound includes one or more selected from the group consisting of chitosan, starch, glucose, polyethyleneimine, monomethyl ether, and carboxymethyl chitosan.

Preferably, the electronegative water-soluble polymer compound includes one or more selected from the group consisting of phosphate, phytate, alginate, lignosulfonate, polyethyleneimine, phytic acid, polyacrylic acid, and dodecyl benzene sulfonate.

Preferably, the M(OH)(OCH$_3$) further includes modified M(OH)(OCH$_3$).

Preferably, the M(OH)(OCH$_3$) in the first coating has a mass percent of 0-5%.

The M(OH)(OCH$_3$) in the second coating has a mass percent of 0-5%.

The mass percent of the M(OH)(OCH$_3$) in the first coating and the mass percent of the M(OH)(OCH$_3$) in the second coating are not equal to 0 at the same time.

Preferably, when n=1, the first coating has a thickness of 0.2-1 μm, and the second coating has a thickness of 0.2-1 μm.

Preferably, when n≥2, the composite coating includes a 1st unit coating and an n-th unit coating.

In the 1st unit coating, the first coating has a thickness of 0.2-1 μm, and the second coating has a thickness of 0.2-1 μm.

In the n-th unit coating, the first coating has a thickness of 0.2-1 μm, and the second coating has a thickness of 0.2-1 μm.

The present disclosure further provides a preparation method of the composite coating according to the above technical solution, including the following step:

alternately coating a first coating solution and a second coating solution on a surface of a substrate n times to obtain the composite coating, where n≥1.

The first coating solution and the second coating solution both include a water-soluble polymer compound.

The water-soluble polymer compound includes an electropositive water-soluble polymer compound or an electronegative water-soluble polymer compound.

The water-soluble polymer compounds in the first coating solution and the second coating solution have opposite electrical properties.

The first coating solution and/or the second coating solution further include/includes M(OH)(OCH$_3$), where the M includes one or more selected from the group consisting of Co, Ni, Fe, Mg, Al, and Zn.

Preferably, the water-soluble polymer compound in the first coating solution has a mass percent of 0.1-60%.

The water-soluble polymer compound in the second coating solution has a mass percent of 0.1-60%.

The present disclosure further provides use of the composite coating according to the above technical solution or a composite coating prepared by the preparation method according to the above technical solution in flame-retardant polymers.

The present disclosure provides a composite coating, including n unit coatings arranged in layers, where n≥1. Each of the unit coatings includes a first coating and a second coating arranged in layers in sequence. The first coating and the second coating both include a water-soluble polymer compound. The water-soluble polymer compound includes an electropositive water-soluble polymer compound or an electronegative water-soluble polymer compound. The water-soluble polymer compounds in the first coating and the second coating have opposite electrical properties. The first coating and/or the second coating further include/includes $M(OH)(OCH_3)$, where the M includes one or more selected from the group consisting of Co, Ni, Fe, Mg, Al, and Zn. In the present disclosure, the $M(OH)(OCH_3)$ is added to the composite coating, which can form an inorganic protective layer on the surface of the substrate through the synergistic effect with the water-soluble polymer compound in the composite coating, and further improve the flame retardancy, fire resistance, and heat insulation performance of the composite coating.

DETAILED DESCRIPTION OF THE EMBODIMENTS

Figure 1:
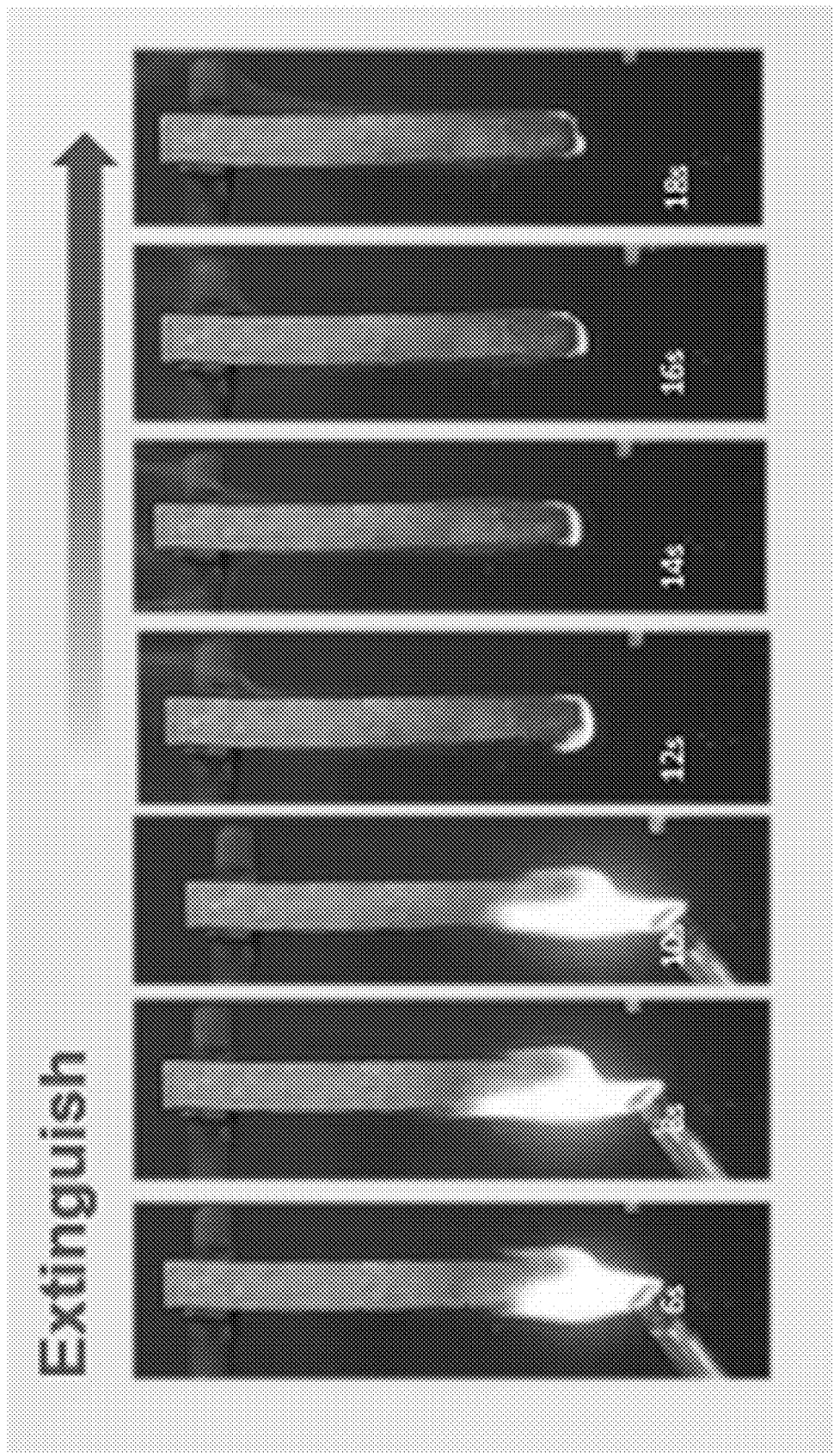
FIG. 1 shows vertical burning test images of polyurethane foam (PUF) containing a composite coating obtained in Example 1.

The present disclosure provides a composite coating, including n unit coatings arranged in layers, where n≥1. Each of the unit coatings includes a first coating and a second coating.

The water-soluble polymer compound includes an electropositive water-soluble polymer compound or an electronegative water-soluble polymer compound.

The water-soluble polymer compounds in the first coating and the second coating have opposite electrical properties.

The first coating and/or the second coating further include/includes $M(OH)(OCH_3)$, where the M includes one or more selected from the group consisting of Co, Ni, Fe, Mg, Al, and Zn.

In the present disclosure, the first coating and the second coating both include a water-soluble polymer compound. In the present disclosure, the water-soluble polymer compound includes the electropositive water-soluble polymer compound or the electronegative water-soluble polymer compound.

In the present disclosure, the electropositive water-soluble polymer compound preferably includes one or more selected from the group consisting of chitosan, starch, glucose, polyethyleneimine, monomethyl ether, and carboxymethyl chitosan. In the present disclosure, the electronegative water-soluble polymer compound preferably includes one or more selected from the group consisting of phosphate, phytate, alginate, lignosulfonate, polyethyleneimine, phytic acid, polyacrylic acid, and dodecyl benzene sulfonate. The phosphate is further preferably hexametaphosphate.

In the present disclosure, the water-soluble polymer compounds in the first coating and the second coating have opposite electrical properties. In the present disclosure, when the first coating includes an electropositive water-soluble polymer compound, the second coating includes an electronegative water-soluble polymer compound. When the first coating includes an electronegative water-soluble polymer compound, the second coating includes an electropositive water-soluble polymer compound. In the present disclosure, the water-soluble polymer compounds in the first coating and the second coating are different from each other and are not polyethyleneimine at the same time.

In the present disclosure, the first coating and/or the second coating further include/includes $M(OH)(OCH_3)$, where the M includes one or more selected from the group consisting of Co, Ni, Fe, Mg, Al, and Zn.

In the present disclosure, the $M(OH)(OCH_3)$ further preferably includes modified $M(OH)(OCH_3)$.

In the present disclosure, the modified $M(OH)(OCH_3)$ preferably includes metal-organic framework modified $M(OH)(OCH_3)$ and melamine phosphate modified $M(OH)(OCH_3)$.

In the present disclosure, the metal-organic framework modified $M(OH)(OCH_3)$ is further preferably dimethylimidazole cobalt (ZIF-67) modified $M(OH)(OCH_3)$.

In the present disclosure, a preparation method of the dimethylimidazole cobalt (ZIF-67) modified $M(OH)(OCH_3)$ preferably includes the following steps.

Cobalt nitrate hexahydrate, $M(OH)(OCH_3)$, 2-methylimidazole, and a polar solvent are mixed and subjected to standing for aging to obtain the dimethylimidazole cobalt (ZIF-67) modified $M(OH)(OCH_3)$.

In the present disclosure, the polar solvent preferably includes one or more selected from the group consisting of methanol, N, N-dimethylformamide, and ethanol.

In the present disclosure, the cobalt nitrate hexahydrate, the $M(OH)(OCH_3)$, and the 2-methylimidazole have a mass ratio of preferably (1-6):(1-3):(1-8). In the present disclosure, the cobalt nitrate hexahydrate in a mixed solution obtained by the mixing has a mass concentration of preferably 1-20%, further preferably 7.5%.

In the present disclosure, a mixing process is as follows.

The cobalt nitrate hexahydrate, the $M(OH)(OCH_3)$, and parts of the polar solvent are subjected to first mixing to obtain a first mixed solution.

The 2-methylimidazole and the remaining polar solvent are subjected to second mixing to obtain a second mixed solution.

The first mixed solution and the second mixed solution are subjected to third mixing.

In the present disclosure, the cobalt nitrate hexahydrate in the first mixed solution has a mass concentration of preferably 1-20%, further preferably 15%. In the present disclosure, the first mixing is preferably conducted under the condition of ultrasound at a power of preferably 30-90 W for preferably 10-30 min.

In the present disclosure, the 2-methylimidazole in the second mixed solution has a mass concentration of preferably 1-40%, further preferably 20%. The present disclosure has no special limitations on the process of the second mixing, and a process well known to those skilled in the art may be adopted.

In the present disclosure, the third mixing is preferably conducted under a condition of stirring at preferably 200-1,000 rpm for preferably 2-4 h.

In the present disclosure, the standing for aging is conducted for preferably 8-24 h at preferably 25° C.

After the standing for aging is completed, the present disclosure further preferably includes filtering, washing, and drying products obtained from the reaction in sequence.

The present disclosure has no special limitations on the filtering process, and a process well known to those skilled in the art may be adopted. In the present disclosure, a reagent used for washing is preferably methanol. The present disclosure has no special limitations on the washing process, and a process well known to those skilled in the art may be adopted. In the present disclosure, the washing is conducted for preferably 1-3 times. In the present disclosure, the drying is conducted at preferably 60-80° C. for preferably 8-24 h. In the present disclosure, the drying is preferably conducted in an oven.

In the present disclosure, a preparation method of the melamine phosphate modified $M(OH)(OCH_3)$ preferably includes the following step.

Melamine phosphate, $M(OH)(OCH_3)$, and water are mixed for a liquid phase reaction to obtain the melamine phosphate modified $M(OH)(OCH_3)$.

In the present disclosure, the water is preferably deionized water.

In the present disclosure, the melamine phosphate and the $M(OH)(OCH_3)$ have a mass ratio of preferably (1-20):(1-20), further preferably (3-15):(2-15), and more preferably (5-10):(5-10). In the present disclosure, the $M(OH)(OCH_3)$ in a mixed solution obtained by the mixing has a mass concentration of preferably 0.1-10%, further preferably 4%.

In the present disclosure, the mixing is preferably conducted under a condition of stirring at preferably 200-1,000 rpm for preferably 5-10 min.

In the present disclosure, the liquid phase reaction is conducted at preferably 50-80° C., further preferably 55-75° C., and more preferably 60-70° C., for preferably 5-10 h. In the present disclosure, the liquid phase reaction is preferably conducted under a condition of stirring at preferably 200-1,000 rpm.

After the liquid phase reaction is completed, the present disclosure further preferably includes centrifuging and drying products obtained from the reaction in sequence.

In the present disclosure, the centrifugation is conducted at preferably 200-2,000 rpm for preferably 3 min. After the centrifugation is completed, the present disclosure preferably dries the precipitate obtained. In the present disclosure, the drying is conducted at preferably 60-80° C. for preferably 8-24 h. In the present disclosure, the drying is preferably conducted under a vacuum condition.

In the present disclosure, the $M(OH)(OCH_3)$ in the first coating has a mass percent of preferably 0-5%. In the present disclosure, the $M(OH)(OCH_3)$ in the second coating has a mass percent of preferably 0-5%. In the present disclosure, the mass percent of the $M(OH)(OCH_3)$ in the first coating and the mass percent of the $M(OH)(OCH_3)$ in the second coating are preferably not equal to 0 at the same time.

In the present disclosure, when n=1, the first coating has a thickness of preferably 0.2-1 μm, and the second coating has a thickness of preferably 0.2-1 μm.

In the present disclosure, when n≥2, the composite coating preferably includes a 1st unit coating and an n-th unit coating. In the present disclosure, in the 1st unit coating, the first coating has a thickness of preferably 0.2-1 μm, and the second coating has a thickness of preferably 0.2-1 μm. In the present disclosure, in the n-th unit coating, the first coating has a thickness of preferably 0.2-1 μm, and the second coating has a thickness of preferably 0.2-1 μm.

The present disclosure further provides a preparation method of the composite coating according to the above technical solution, including the following step.

A first coating solution and a second coating solution are alternately coated on a surface of a substrate n times to obtain the composite coating, where n≥1.

The first coating solution and the second coating solution both include a water-soluble polymer compound.

The water-soluble polymer compound includes an electropositive water-soluble polymer compound or an electronegative water-soluble polymer compound.

The water-soluble polymer compounds in the first coating solution and the second coating solution have opposite electrical properties.

The first coating solution and/or the second coating solution further include/includes $M(OH)(OCH_3)$, where the M is Co and/or Ni.

In the present disclosure, unless otherwise specified, all raw materials required for preparation are commercially available products well known to those skilled in the art.

In the present disclosure, the substrate preferably includes one or more selected from the group consisting of foam, a film, woven fabric, and paper. The foam preferably includes PUF. The film includes a polyethylene terephthalate film or polylactic acid film. The woven fabric preferably includes non-woven fabric, cotton fabric, ramie fabric, polyester fabric, or polyethylene terephthalate fabric.

The present disclosure further preferably includes pretreatment of the substrate prior to the coating. In the present disclosure, the pretreatment preferably includes electropositive or electronegative pretreatment.

In the present disclosure, when the water-soluble polymer compound in the first coating solution is an electronegative aqueous solution polymer compound, the pretreatment mode is preferably the electropositive pretreatment. The electropositive pretreatment preferably includes the following steps: the substrate is immersed in an HNO3 solution with a mass concentration of 0.1% and water in sequence and dried to obtain a substrate subjected to the electropositive pretreatment.

In the present disclosure, the substrate is immersed in the HNO3 solution with a mass concentration of 0.1% for preferably 5 min and in the water for preferably 30-50 s. In the present disclosure, the drying is conducted at preferably 60° C. for preferably 6 h. In the present disclosure, a positive charge can be generated on the surface of the substrate by the electropositive pretreatment.

In the present disclosure, when the water-soluble polymer compound in the first coating solution is an electropositive aqueous solution polymer compound, the pretreatment mode is preferably the electronegative pretreatment. The electronegative pretreatment preferably includes the following steps.

The substrate is placed in deionized water for ultrasonic treatment. The substrate subjected to the ultrasonic treatment is placed in ethanol for primary immersion and subjected to primary drying.

A dried substrate is placed in a polyethyleneimine solution for secondary immersion and subjected to secondary drying, and placed in a polyacrylic acid solution for tertiary immersion and subjected to tertiary drying to obtain a substrate subjected to the electronegative pretreatment.

Or, the dried substrate is placed in a polyacrylic acid solution for secondary immersion and subjected to secondary drying, and placed in a polyethyleneimine solution for tertiary immersion and subjected to tertiary drying to obtain a substrate subjected to the electronegative pretreatment.

In the present disclosure, the ultrasonic treatment is conducted at a power of preferably 90 W with a frequency of preferably 40 KHz for preferably 15 min.

In the present disclosure, the primary immersion is conducted for preferably 10 min. After the primary immersion, the present disclosure further preferably includes extruding liquid in the substrate. The present disclosure has no special limitations on the extruding process, and a process well known to those skilled in the art may be adopted. In the present disclosure, the primary drying is conducted at preferably 60° C. The present disclosure has no special limitations on the time of the primary drying, as long as the dried film can be obtained.

In the present disclosure, the polyethyleneimine solution has a concentration of preferably 0.1 wt. %. In the present disclosure, the polyacrylic acid solution has a mass concentration of preferably 1 wt. %. In the present disclosure, the secondary immersion is conducted for preferably 10 min. After the secondary immersion, the present disclosure further preferably includes extruding liquid in the substrate. The present disclosure has no special limitations on the extruding process, and a process well known to those skilled in the art may be adopted. In the present disclosure, the secondary drying is conducted at preferably 60° C. In the present disclosure, the tertiary immersion is conducted for preferably 10 min. After the tertiary immersion, the present disclosure further preferably includes extruding liquid in the substrate. The present disclosure has no special limitations on the extruding process, and a process well known to those skilled in the art may be adopted. In the present disclosure, the tertiary drying is conducted at preferably 60° C. for preferably 10 min. The present disclosure has no special limitations on the time of the secondary drying and the tertiary drying, as long as the dried film can be obtained.

In the present disclosure, a negative charge can be generated on the surface of the substrate by the electronegative pretreatment.

In the present disclosure, the first coating solution and the second coating solution both include a water-soluble polymer compound. In the present disclosure, the water-soluble polymer compound is the same as the water-soluble polymer compound described in the above technical solution, and will not be repeated here.

In the present disclosure, the water-soluble polymer compounds in the first coating solution and the second coating solution have opposite electrical properties. In the present disclosure, when the first coating solution includes an electropositive water-soluble polymer compound, the second coating solution includes an electronegative water-soluble polymer compound. When the first coating solution includes an electronegative water-soluble polymer compound, the second coating solution includes an electropositive water-soluble polymer compound.

In the present disclosure, the first coating solution and/or the second coating solution further include/includes M(OH)(OCH$_3$), where the M includes one or more selected from the group consisting of Co, Ni, Fe, Mg, Al, and Zn.

In the present disclosure, the water-soluble polymer compound in the first coating solution has a mass percent of preferably 0.1-60%, further preferably 5-55%, more preferably 10-50%. The M(OH)(OCH$_3$) in the first coating solution has a mass percent of preferably 0-5%.

In the present disclosure, the water-soluble polymer compound in the second coating solution has a mass percent of preferably 0.1-60%, further preferably 5-55%, more preferably 10-50%. The M(OH)(OCH$_3$) in the second coating solution has a mass percent of preferably 0-5%.

In the present disclosure, the mass percent of the M(OH)(OCH$_3$) in the first coating solution and the mass percent of the M(OH)(OCH$_3$) in the second coating solution are preferably not equal to 0 at the same time.

In the present disclosure, the first coating solution is preferably obtained by preparation, and a preparation method preferably includes the following step.

A water-soluble polymer compound is mixed with water to obtain the first coating solution.

In the present disclosure, the water is preferably deionized water. In the present disclosure, the mixing is preferably conducted under a condition of stirring at preferably 1,000 rpm for preferably 15 min.

In the present disclosure, when the first coating solution further includes the M(OH)(OCH$_3$), a preparation method of the first coating solution preferably includes the following steps.

The M(OH)(OCH3) and water are subjected to first mixing to obtain a first mixed solution, where the M includes one or more selected from the group consisting of Co, Ni, Fe, Mg, Al, and Zn.

The water-soluble polymer compound and water are subjected to second mixing to obtain a second mixed solution.

The first mixed solution and the second mixed solution are subjected to third mixing to obtain the first coating solution.

In the present disclosure, the first mixing is preferably conducted under a condition of ultrasound. In the present disclosure, the ultrasonic treatment is conducted at a power of preferably 90 W with a frequency of preferably 40 KHz for preferably 15 min. In the present disclosure, in the first mixed solution, the M(OH)(OCH3) has a mass percent of preferably 0-5%.

In the present disclosure, the second mixing is preferably conducted under a condition of stirring at preferably 1,000 rpm for preferably 15 min. In the present disclosure, in the second mixed solution, the water-soluble polymer compound has a mass percent of preferably 0.1-60%.

In the present disclosure, the first mixed solution and the second mixed solution have a volume ratio of preferably 1:4. In the present disclosure, a process of the third mixing preferably includes: adding the first mixed solution into the second mixed solution, and conducting ultrasonic treatment and stirring in sequence. In the present disclosure, the ultrasonic treatment is conducted at a power of preferably 90 W with a frequency of preferably 40 KHz for preferably 15 min. In the present disclosure, the stirring is conducted at preferably 1,000 rpm for preferably 15 min. In the present disclosure, the ultrasonic treatment and the stirring are recorded as one cycle, and the number of cycles is preferably four.

In the present disclosure, the second coating solution is preferably obtained by preparation. In the present disclosure, a preparation method of the second coating solution is the same as that for the first coating solution defined above, and will not be repeated here.

In the present disclosure, the coating mode is preferably impregnation.

In the present disclosure, when one time of impregnation is conducted, in the first coating solution, the impregnation is conducted for preferably 1-10 min, and in the second coating solution, the impregnation is conducted for preferably 1-10 min.

In the present disclosure, when n times of impregnation are conducted, the impregnation preferably includes the 1st impregnation and the n-th impregnation, where n≥2.

In the present disclosure, when the 1st impregnation is conducted, in the first coating solution, the impregnation is conducted for preferably 1-10 min, and in the second coating solution, the impregnation is conducted for preferably 1-10 min. In the present disclosure, when the n-th impregnation is conducted, in the first coating solution, the impregnation is conducted for preferably 1-10 min, and in the second coating solution, the impregnation is conducted for preferably 1-10 min.

After the impregnation in the first coating solution is completed, the present disclosure preferably includes drying a liquid membrane obtained by the impregnation at preferably 60° C. The present disclosure has no special limitations on the time of the drying, as long as the dried film can be obtained.

After the impregnation in the second coating solution is completed, the present disclosure preferably includes drying a liquid membrane obtained by the impregnation at preferably 60° C. The present disclosure has no special limitations on the time of the drying, as long as the dried film can be obtained.

The present disclosure further provides use of the composite coating according to the above technical solution or a composite coating prepared by the preparation method according to the above technical solution in flame-retardant polymers. The present disclosure has no special requirements for the implementation of application, and a manner well known to those skilled in the art may be adopted.

In order to further illustrate the present disclosure, the composite coating and the preparation method and use thereof provided by the present disclosure are described in detail below with reference to the accompanying drawings and examples, but the accompanying drawings and the examples should not be construed as limiting the protection scope of the present disclosure.

Example 1

PUF was placed in deionized water, and subjected to ultrasonic treatment at a power of 90 W with a frequency of 40 KHz for 15 min. The PUF subjected to the ultrasonic treatment was placed in ethanol for immersion for 15 min. Liquid was extruded, and drying was conducted at 60° C.

The dried PUF was immersed in a polyethyleneimine solution with a concentration of 0.1 wt. % for 10 min. Liquid was extruded, and drying was conducted at 60° C. The dried PUF was immersed in a polyacrylic acid solution with a concentration of 1 wt. % for 10 min. Liquid was extruded, and drying was conducted at 60° C. to obtain PUF subjected to electronegative pretreatment.

1.5 g of M(OH)(OCH3)(the M was Co and Ni) and 150 mL of water were mixed, and subjected to ultrasonic treatment at a power of 90 W with a frequency of 40 KHz for 15 min. The operations were repeated twice to obtain a first mixed solution.

6 g of carboxymethyl chitosan and 400 mL of deionized water were mixed, and stirred at 1,000 rpm for 1 h to obtain a second mixed solution.

100 mL of the first mixed solution was added into 400 mL of the second mixed solution, subjected to ultrasonic treatment at a power of 90 W with a frequency of 40 KHz for 15 min, and stirred at 1,000 rpm for 15 min, which was recorded as one cycle. The above cycle was repeated for 4 times to obtain a first coating solution.

6 g of sodium hexametaphosphate and 400 mL of deionized water were mixed, and stirred at 1,000 rpm for 1 h to obtain a second coating solution.

The PUF subjected to the electronegative pretreatment was impregnated in the first coating solution for 1 min and dried at 60° C., and impregnated in the second coating solution for 30 s and dried at 60° C. The above coating process was repeated for 7 times to obtain PUF containing the composite coating.

Example 2

A polyethylene terephthalate film was placed in deionized water, and subjected to ultrasonic treatment at a power of 90 W with a frequency of 40 KHz for 15 min. The polyethylene terephthalate film subjected to the ultrasonic treatment was placed in ethanol for immersion for 15 min. Liquid was extruded, and drying was conducted at 60° C.

The dried polyethylene terephthalate film was immersed in a polyethyleneimine solution with a concentration of 0.1 wt. % for 10 min. Liquid was extruded, and drying was conducted at 60° C. The dried PUF was immersed in a polyacrylic acid solution with a concentration of 1 wt. % for 10 min. Liquid was extruded, and drying was conducted at 60° C. to obtain a polyethylene terephthalate film subjected to electronegative pretreatment.

1.5 g of M(OH)(OCH3)(the M was Co and Ni) and 150 mL of water were mixed, and subjected to ultrasonic treatment at a power of 90 W with a frequency of 40 KHz for 15 min. The operations were repeated twice to obtain a first mixed solution.

6 g of carboxymethyl chitosan and 400 mL of deionized water were mixed, and stirred at 1,000 rpm for 1 h to obtain a second mixed solution.

100 mL of the first mixed solution was added into 400 mL of the second mixed solution, subjected to ultrasonic treatment at a power of 90 W with a frequency of 40 KHz for 15 min, and stirred at 1,000 rpm for 15 min, which was recorded as one cycle. The above cycle was repeated for 4 times to obtain a first coating solution.

1.5 g of sodium hexametaphosphate and 100 mL of deionized water were mixed, and stirred at 1,000 rpm for 1 h to obtain a second coating solution.

The polyethylene terephthalate film subjected to the electronegative pretreatment was impregnated in the first coating solution for 1 min and dried at 60° C., and impregnated in the second coating solution for 30 s and dried at 60° C. The above coating process was repeated for 6 times to obtain a polyethylene terephthalate film containing the composite coating.

Example 3

PUF was placed in deionized water, and subjected to ultrasonic treatment at a power of 90 W with a frequency of 40 KHz for 15 min. The PUF subjected to the ultrasonic treatment was placed in ethanol for immersion for 15 min. Liquid was extruded, and drying was conducted at 60° C.

The dried PUF was immersed in a polyethyleneimine solution with a concentration of 0.1 wt. % for 10 min. Liquid was extruded, and drying was conducted at 60° C. The dried PUF was immersed in a polyacrylic acid solution with a concentration of 1 wt. % for 10 min. Liquid was extruded, and drying was conducted at 60° C. to obtain PUF subjected to electronegative pretreatment.

1.5 g of M(OH)(OCH3)(the M was Co and Ni) and 150 ml of water were mixed, and subjected to ultrasonic treatment at a power of 90 W with a frequency of 40 KHz for 15 min. The operations were repeated twice to obtain a first mixed solution.

6 g of carboxymethyl chitosan and 400 mL of deionized water were mixed, and stirred at 1,000 rpm for 1 h to obtain a second mixed solution.

100 mL of the first mixed solution was added into 400 mL of the second mixed solution, subjected to ultrasonic treatment at a power of 90 W with a frequency of 40 KHz for 15 min, and stirred at 1,000 rpm for 15 min, which was recorded as one cycle. The above cycle was repeated for 4 times to obtain a first coating solution.

6 g of sodium lignosulfonate and 400 mL of deionized water were mixed, and stirred at 1,000 rpm for 1 h to obtain a second coating solution.

The PUF subjected to the electronegative pretreatment was impregnated in the first coating solution for 1 min and dried at 60° C., and impregnated in the second coating solution for 30 s and dried at 60° C. The above coating process was repeated for 6 times to obtain PUF containing the composite coating.

Example 4

Preparation of Dimethylimidazole Cobalt (ZIF-67) Modified M(OH)(OCH3):

3 g of cobalt nitrate hexahydrate, 1.5 g of M(OH)(OCH3) (the M was Co and Ni), and 200 mL of methanol were weighed and subjected to ultrasonic treatment at a power of 90 W for 30 min to obtain a first mixed solution.

4 g of 2-methylimidazole was dissolved in 200 mL of methanol to obtain a second mixed solution.

The first mixed solution and the second mixed solution obtained above were mixed and stirred at 1,000 rpm for 4 h.

An obtained mixed solution was subjected to standing for aging for 24 h at 25° C., filtered, collected and precipitated, washed with methanol for three times, and dried in an oven at 60° C. for 8 h to obtain the dimethylimidazole cobalt (ZIF-67) modified M(OH)(OCH3).

PUF was placed in deionized water, and subjected to ultrasonic treatment at a power of 90 W with a frequency of 40 KHz for 15 min. The PUF subjected to the ultrasonic treatment was placed in ethanol for immersion for 15 min. Liquid was extruded, and drying was conducted at 60° C.

The dried PUF was immersed in a polyethyleneimine solution with a concentration of 0.1 wt. % for 10 min. Liquid was extruded, and drying was conducted at 60° C. The dried PUF was immersed in a polyacrylic acid solution with a concentration of 1 wt. % for 10 min. Liquid was extruded, and drying was conducted at 60° C. to obtain PUF subjected to electronegative pretreatment.

1.5 g of the dimethylimidazole cobalt (ZIF-67) modified M(OH)(OCH3) and 150 mL of water were mixed, and subjected to ultrasonic treatment at a power of 90 W with a frequency of 40 KHz for 15 min. The operations were repeated twice to obtain a first mixed solution.

6 g of carboxymethyl chitosan and 400 mL of deionized water were mixed, and stirred at 1,000 rpm for 1 h to obtain a second mixed solution.

100 mL of the first mixed solution was added into 400 mL of the second mixed solution, subjected to ultrasonic treatment at a power of 90 W with a frequency of 40 KHz for 15 min, and stirred at 1,000 rpm for 15 min, which was recorded as one cycle. The above cycle was repeated for 4 times to obtain a first coating solution.

6 g of sodium hexametaphosphate and 400 mL of deionized water were mixed, and stirred at 1,000 rpm for 1 h to obtain a second coating solution.

The PUF subjected to the electronegative pretreatment was impregnated in the first coating solution for 1 min and dried at 60° C., and impregnated in the second coating solution for 30 s and dried at 60° C. The above coating process was repeated for 6 times to obtain PUF containing the composite coating.

Example 5

Preparation of Melamine Phosphate Modified M(OH) (OCH3):

1.4 g of M(OH)(OCH3)(the M was Co and Ni), 3.0 g of melamine phosphate, and 350 mL of deionized water were stirred at 1,000 rpm for 5 min, and heated at a constant temperature for 5 h at a stirring speed of 1,000 rpm and 50° C. After the reaction, the obtained product was centrifuged at 2,000 rpm for 3 min. After centrifugation, the upper liquid was poured out, and the precipitate was dried under vacuum at 60° C. to obtain the melamine phosphate modified M(OH)(OCH3).

PUF was placed in deionized water, and subjected to ultrasonic treatment at a power of 90 W with a frequency of 40 KHz for 15 min. The PUF subjected to the ultrasonic treatment was placed in ethanol for immersion for 15 min. Liquid was extruded, and drying was conducted at 60° C.

The dried PUF was immersed in a polyethyleneimine solution with a concentration of 0.1 wt. % for 10 min. Liquid was extruded, and drying was conducted at 60° C. The dried PUF was immersed in a polyacrylic acid solution with a concentration of 1 wt. % for 10 min. Liquid was extruded, and drying was conducted at 60° C. to obtain PUF subjected to electronegative pretreatment.

1.5 g of melamine phosphate modified M(OH)(OCH3) (the M was Co and Ni) and 150 mL of water were mixed, and subjected to ultrasonic treatment at a power of 90 W with a frequency of 40 KHz for 15 min. The operations were repeated twice to obtain a first mixed solution.

6 g of carboxymethyl chitosan and 400 mL of deionized water were mixed, and stirred at 1,000 rpm for 1 h to obtain a second mixed solution.

100 mL of the first mixed solution was added into 400 mL of the second mixed solution, subjected to ultrasonic treatment at a power of 90 W with a frequency of 40 KHz for 15 min, and stirred at 1,000 rpm for 15 min, which was recorded as one cycle. The above cycle was repeated for 4 times to obtain a first coating solution.

3 g of sodium phytate and 200 mL of deionized water were mixed, and stirred at 1,000 rpm for 1 h to obtain a second coating solution.

The PUF subjected to the electronegative pretreatment was impregnated in the first coating solution for 1 min and dried at 60° C., and impregnated in the second coating solution for 30 s and dried at 60° C. The above coating process was repeated for 6 times to obtain PUF containing the composite coating.

Example 6

A polyethylene terephthalate film was placed in deionized water, and subjected to ultrasonic treatment at a power of 90 W with a frequency of 40 KHz for 15 min. The polyethylene terephthalate film subjected to the ultrasonic treatment was placed in ethanol for immersion for 15 min. Liquid was extruded, and drying was conducted at 60° C.

The dried polyethylene terephthalate film was immersed in a polyethyleneimine solution with a concentration of 0.1 wt. % for 10 min. Liquid was extruded, and drying was conducted at 60° C. The dried PUF was immersed in a polyacrylic acid solution with a concentration of 1 wt. % for 10 min. Liquid was extruded, and drying was conducted at 60° C. to obtain a polyethylene terephthalate film subjected to electronegative pretreatment.

2 g of M(OH)(OCH3)(the M was Co and Ni) and 100 ml of water were mixed, and subjected to ultrasonic treatment at a power of 90 W with a frequency of 40 KHz for 15 min. The operations were repeated twice to obtain a first mixed solution.

4 g of polyethyleneimine and 400 mL of deionized water were mixed, and stirred at 1,000 rpm for 1 h to obtain a second mixed solution.

100 mL of the first mixed solution was added into 400 mL of the second mixed solution, subjected to ultrasonic treatment at a power of 90 W with a frequency of 40 KHz for 15 min, and stirred at 1,000 rpm for 15 min, which was recorded as one cycle. The above cycle was repeated for 4 times to obtain a first coating solution.

3 g of sodium dodecyl benzene sulfonate and 100 mL of deionized water were mixed, and stirred at 1,000 rpm for 1 h to obtain a second coating solution.

The polyethylene terephthalate film subjected to the electronegative pretreatment was impregnated in the first coating solution for 1 min and dried at 60° C., and impregnated in the second coating solution for 30 s and dried at 60° C. The above coating process was repeated for 19 times to obtain a polyethylene terephthalate film containing the composite coating.

Comparative Example 1

PUF containing a composite coating was prepared in the manner of Example 1, with the difference that the first coating solution did not include M(OH)(OCH3).

Performance Testing

Test Example 1

Figure 2:
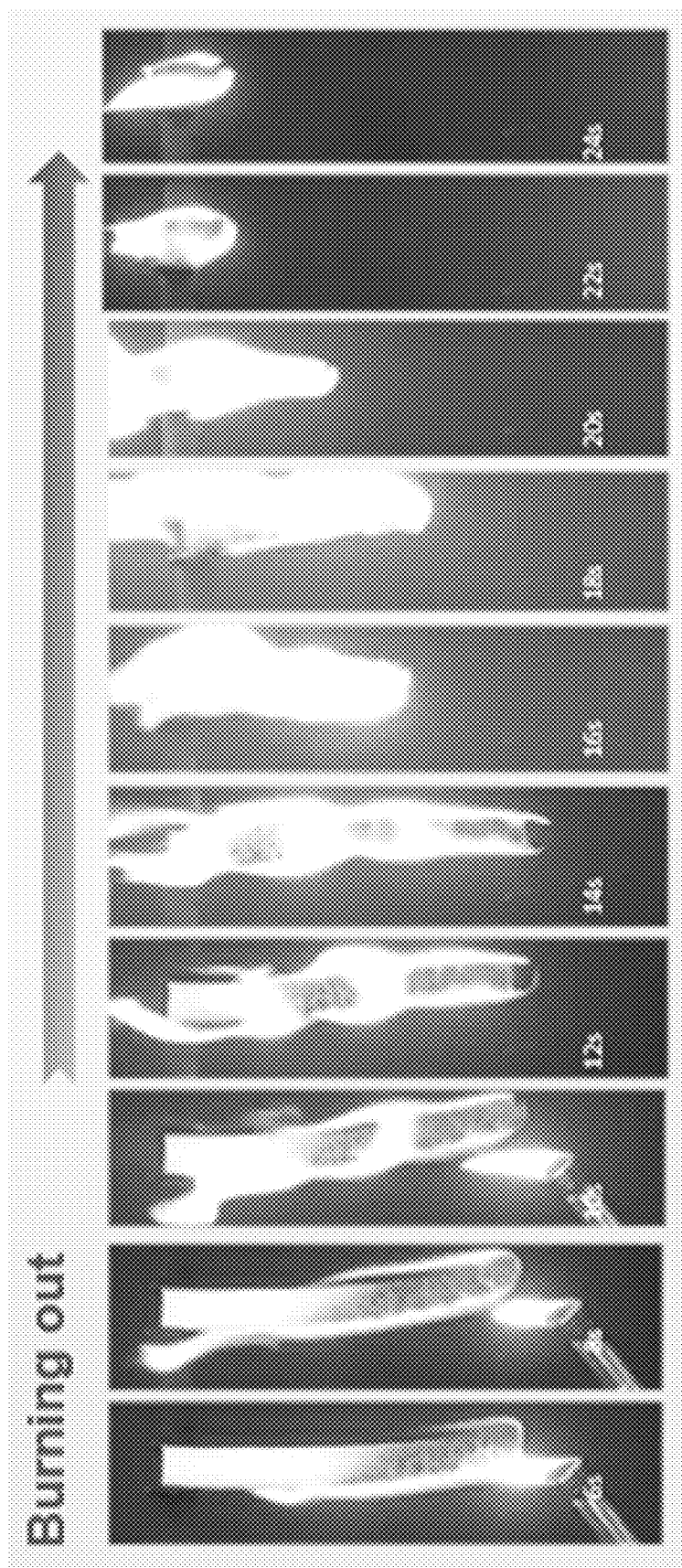
FIG. 2 shows vertical burning test images of PUF containing a composite coating obtained in Comparative Example 1.
Figure 3:
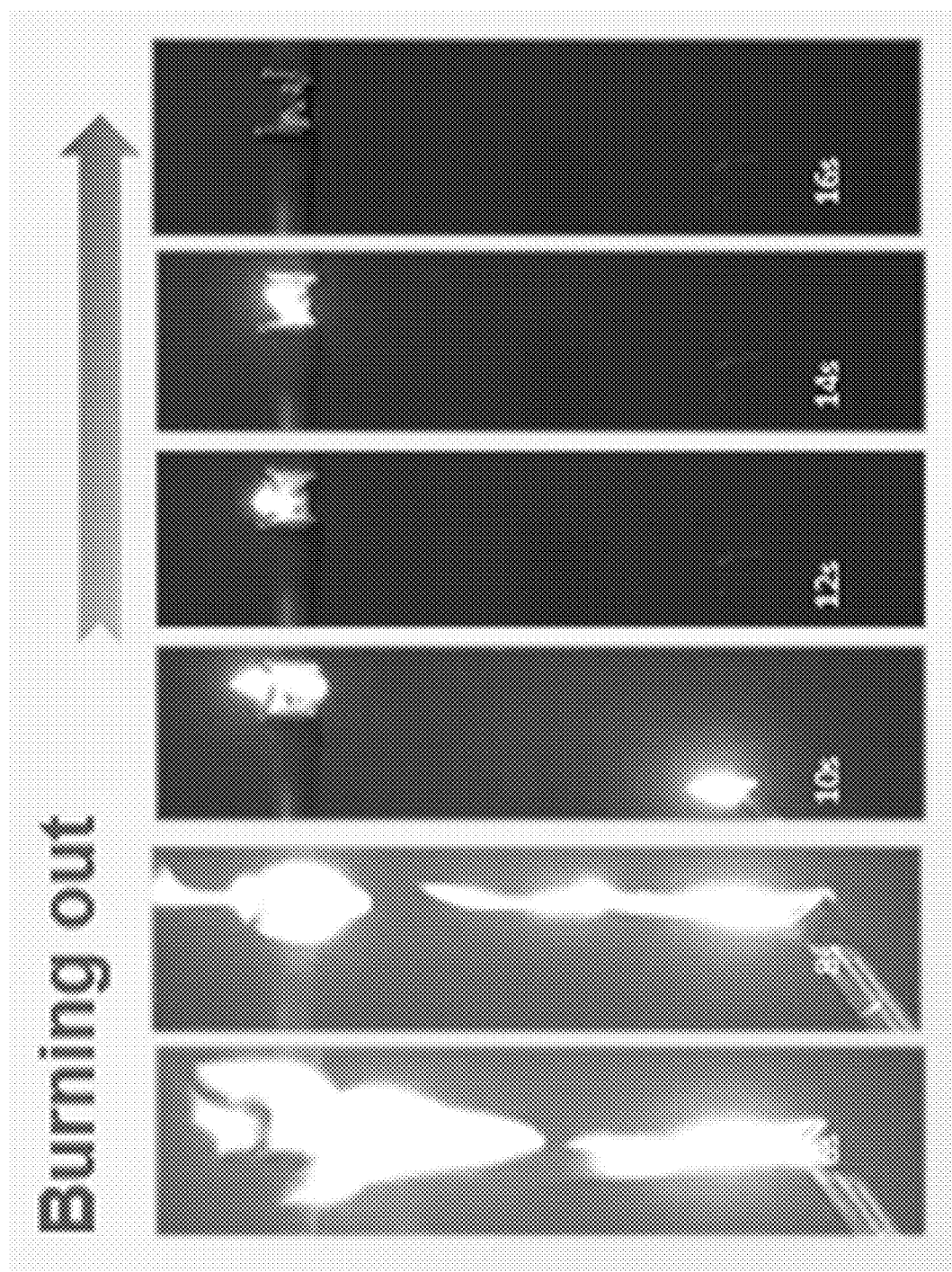
FIG. 3 shows vertical burning test images of blank PUF.

A vertical burning test was conducted on PUF containing a composite coating obtained in Example 1 and Comparative Example 1 and blank PUF according to the UL94 vertical burning standard. A test strip had a size of 120*13*10 mm. Test images of PUF containing a composite coating obtained in Example 1 are shown in FIG. 1. Test images of PUF containing a composite coating obtained in Comparative Example 1 are shown in FIG. 2. Test images of blank PUF are shown in FIG. 3. It can be seen from FIG. 1 to FIG. 3 that the blank PUF burns completely in 16 s, the PUF containing a composite coating obtained in Comparative Example 1 burns completely in 24 s, the PUF containing a composite coating obtained in Example 1 self-extinguishes after 18 s of burning, the flame does not spread upward, the sample remains intact as a whole, and the UL grade reaches V-0.

Test Example 2

A cone calorimeter test was conducted on PUF containing a composite coating obtained in Example 1 and Comparative Example 1 and blank PUF according to the ISO 5660-1 standard.

Figure 4:
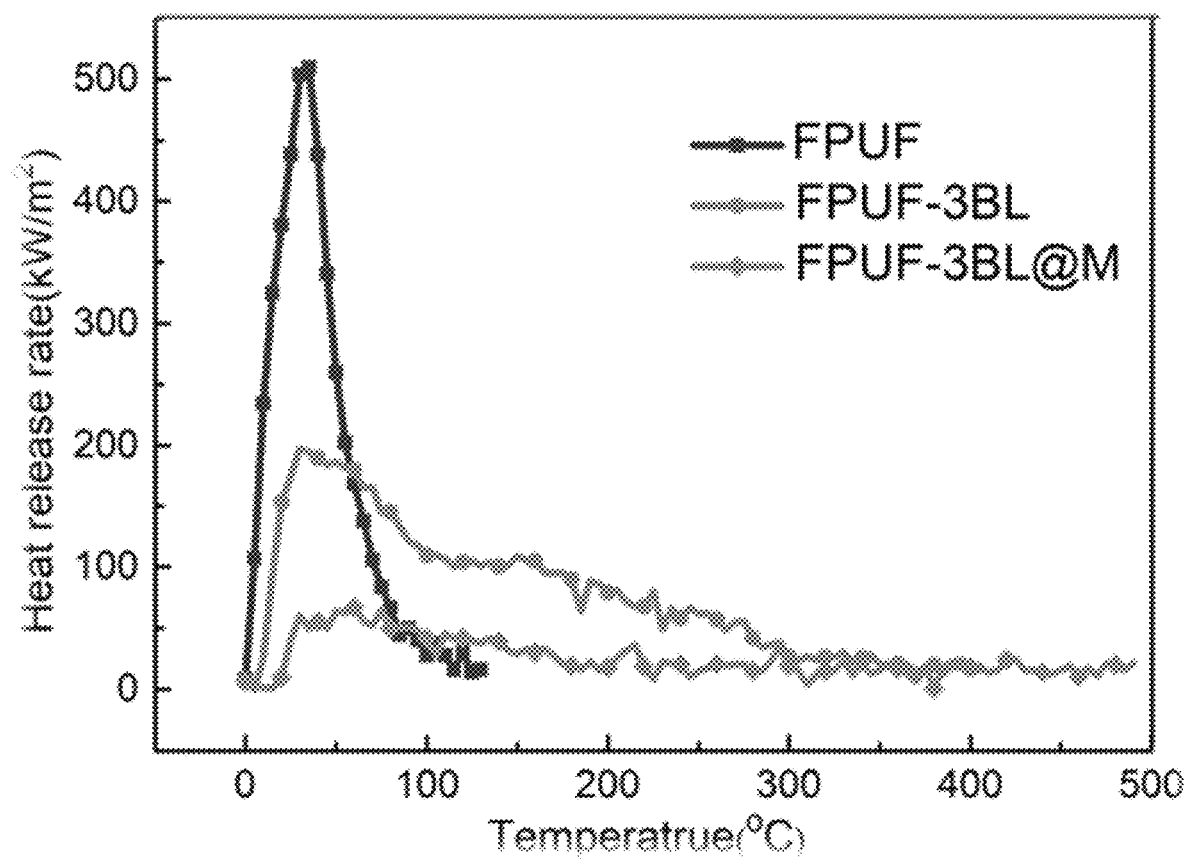
FIG. 4 shows a test result diagram of heat release rates (HRRs) of the PUF containing a composite coating obtained in Example 1 and Comparative Example 1 and the blank PUF.

A test result diagram of HRRs is shown in FIG. 4. It can be seen from FIG. 4 that the PUF obtained in Example 1 (FPUF-3BL@M) has a peak release rate (PHRR) of 66.97 KW/m2, the PUF obtained in Comparative Example 1 (FPUF-3BL) has a PHRR of 197.52 KW/m2, and the blank PUF (FPUF) has a PHRR of 509.48 KW/m2. The PHRR of the PUF containing a composite coating obtained in Example 1 is reduced by 66.2% and 86.9% compared with those of the PUF obtained in Comparative Example 1 and the blank PUF.

Figure 5:
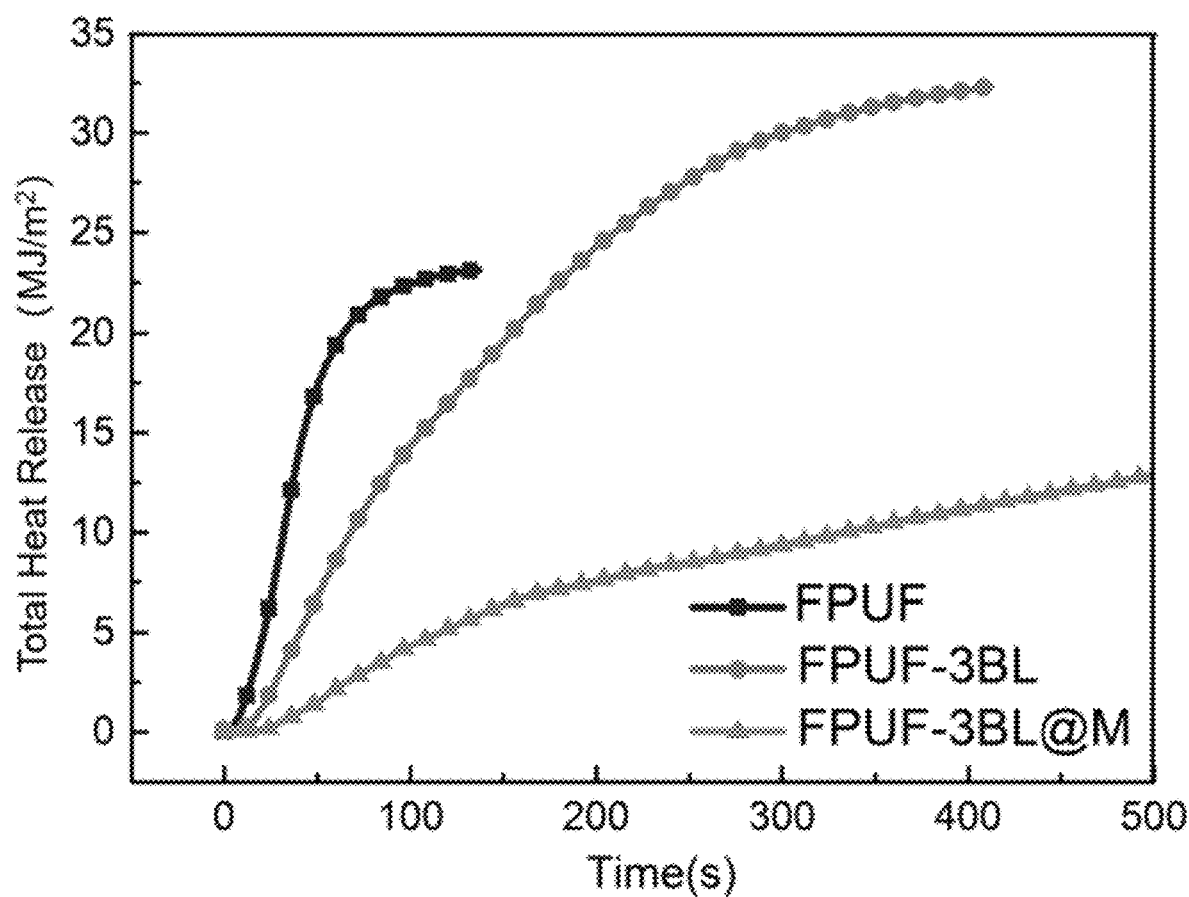
FIG. 5 shows a test result diagram of total heat releases (THRs) of the PUF containing a composite coating obtained in Example 1 and Comparative Example 1 and the blank PUF.

A test result diagram of THRs is shown in FIG. 5. It can be seen from FIG. 5 that the PUF obtained in Example 1 (FPUF-3BL@M) has a THR of 12.73 MJ/m2, the PUF obtained in Comparative Example 1 (FPUF-3BL) has a THR of 32.20 MJ/m2, and the blank PUF (FPUF) has a THR of 22.08 MJ/m2. The peak THR of the PUF containing a composite coating obtained in Example 1 is reduced by 60.5% and 42.3% compared with those of the PUF obtained in Comparative Example 1 and the blank PUF.

Figure 6:
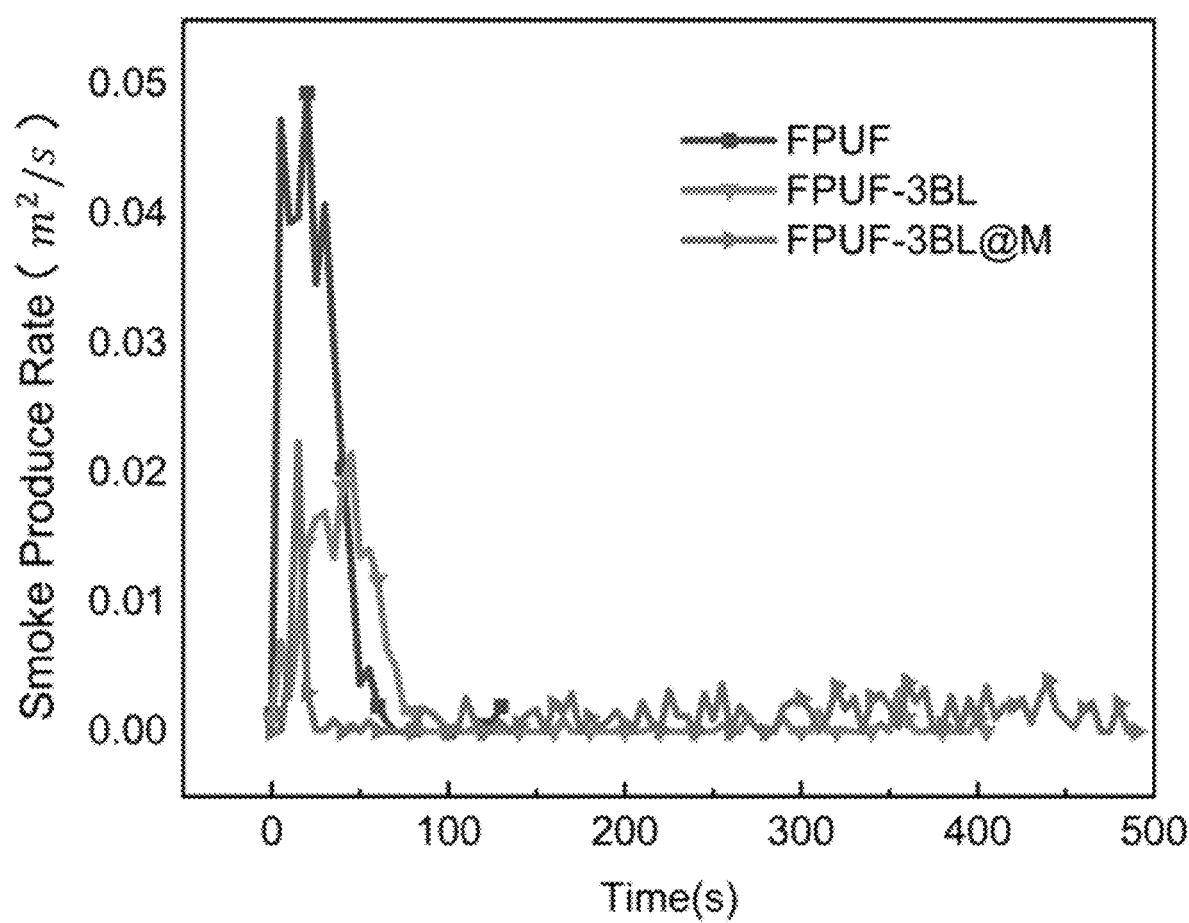
FIG. 6 shows a test result diagram of smoke production rates (SPRs) of the PUF containing a composite coating obtained in Example 1 and Comparative Example 1 and the blank PUF.

A test result diagram of SPRs is shown in FIG. 6. It can be seen from FIG. 6 that the PUF obtained in Example 1 (FPUF-3BL@M) has a total smoke production amount of 0.76 m2, the PUF obtained in Comparative Example 1 (FPUF-3BL) has a total smoke production amount of 1.01 m2, and the blank PUF (FPUF) has a total smoke production amount of 1.75 m2. The total smoke production amount of the PUF containing a composite coating obtained in Example 1 is reduced by 24.8% and 56.6% compared with those of the PUF obtained in Comparative Example 1 and the blank PUF.

Test Example 3

A burn-through resistance test was conducted on the PUF containing a composite coating obtained in Example 1.

Figure 7:
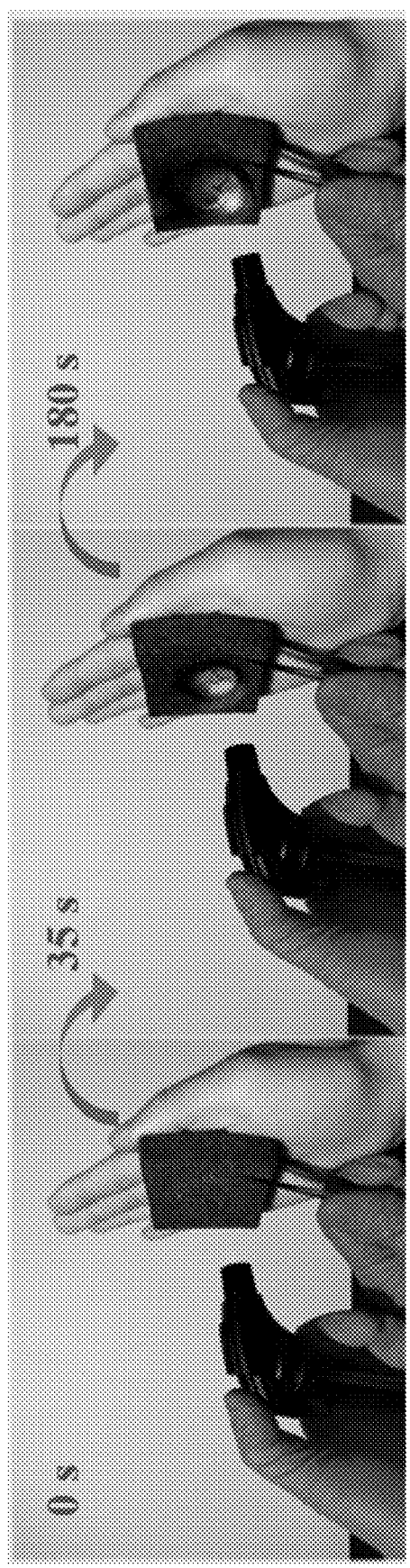
FIG. 7 shows burn-through resistance test images of the PUF containing a composite coating obtained in Example 1.

A method for the burn-through resistance test was as follows. The sample had a size of 100*100*12 mm. Under the condition of butane flame contact burning, the burn-through resistance was displayed intuitively by the somatosensory tolerance of human skin. A process of the burn-through resistance test is shown in FIG. 7. It can be seen from FIG. 7 that the sample obtained in Example 1 can keep the back somatosensory temperature within an acceptable range for at least 3 min under the condition of direct flame injection, and the flame cannot burn through.

A temperature resistance test was conducted on PUF containing a composite coating obtained in Example 1 and Comparative Example 1.

Figure 8:
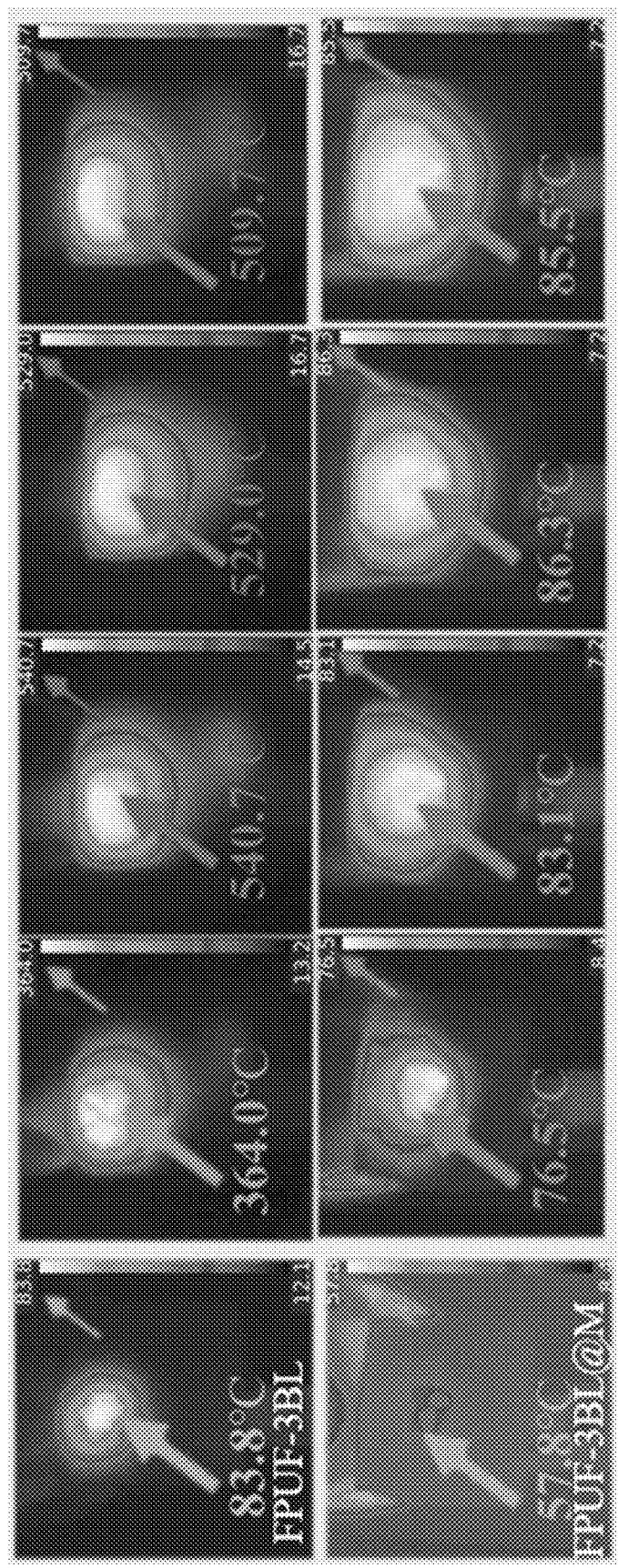
FIG. 8 shows infrared thermal images of the PUF containing a composite coating obtained in Example 1 and Comparative Example 1 under butane flame burning.
Figure 9:
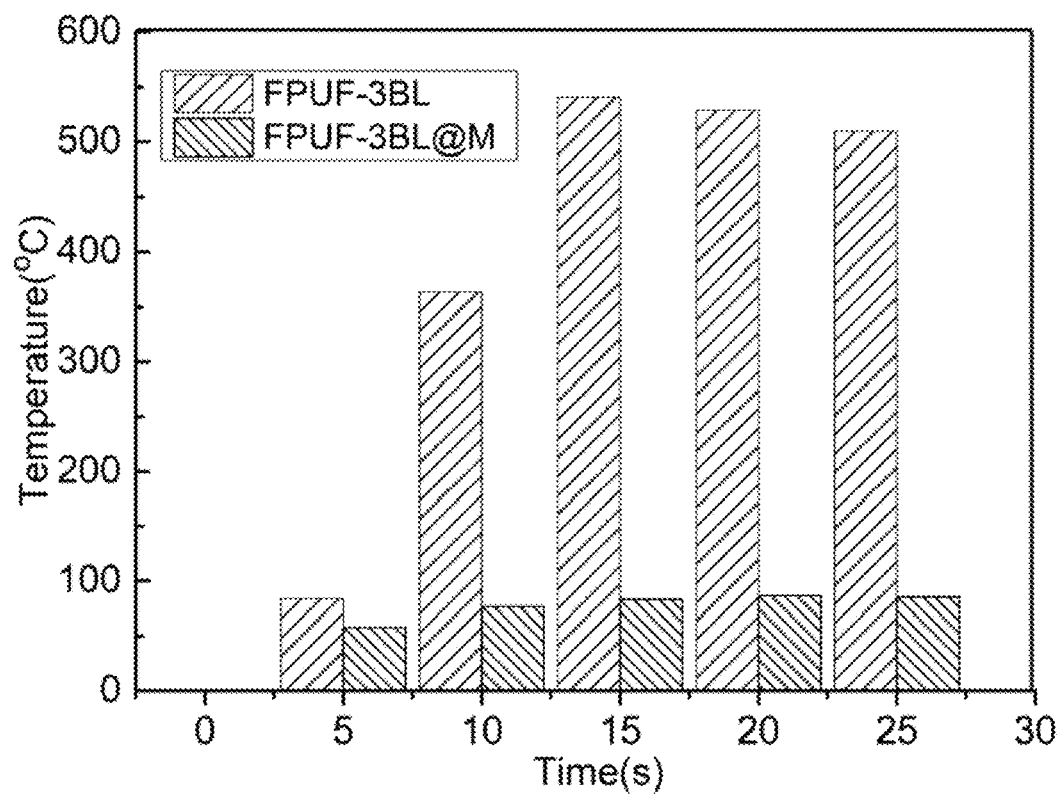
FIG. 9 shows temperatures of the PUF containing a composite coating obtained in Example 1 and Comparative Example 1 at different times in a temperature resistance test.

A method for the temperature resistance test was as follows. The sample had a size of 50*50*8 mm. The butane flame was used for burning. The infrared images of the back of the sample are shown in FIG. 8. Temperatures at different times shown by infrared thermal imaging are shown in FIG. 9. It can be seen from FIG. 8 and FIG. 9 that compared with that of the PUF containing a composite coating obtained in Comparative Example 1 (FPUF-3BL), the temperature of the back of the PUF containing a composite coating obtained in Example 1 (FPUF-3BL@M) rises slowly, and the final temperature of the experiment is only 85.5° C., showing an obvious fire resistance and heat insulation effect.

Figure 10:
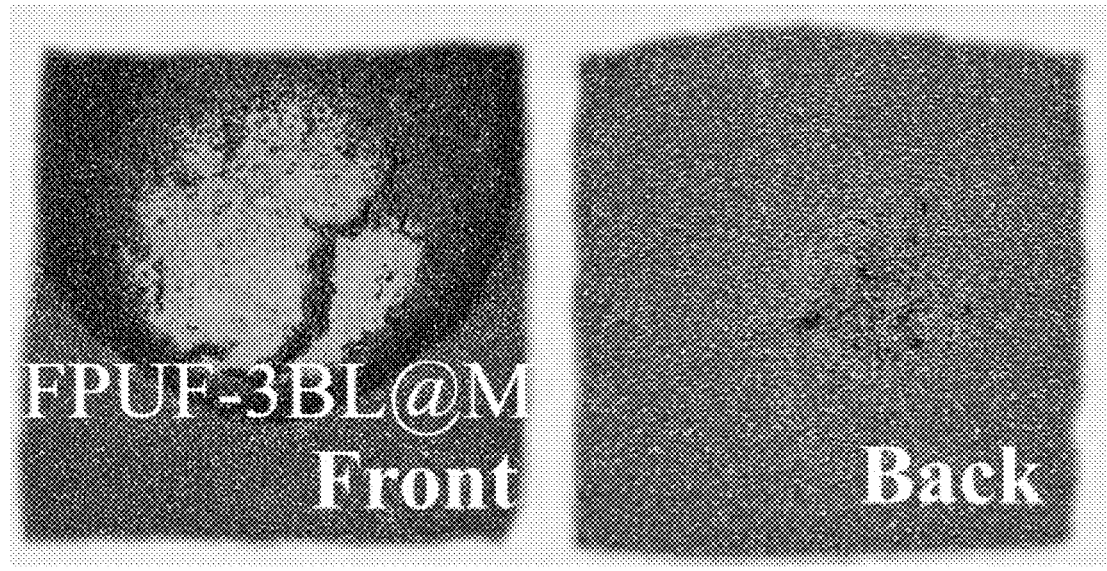
FIG. 10 shows physical pictures of the PUF containing a composite coating obtained in Example 1 after the temperature resistance test.
Figure 11:
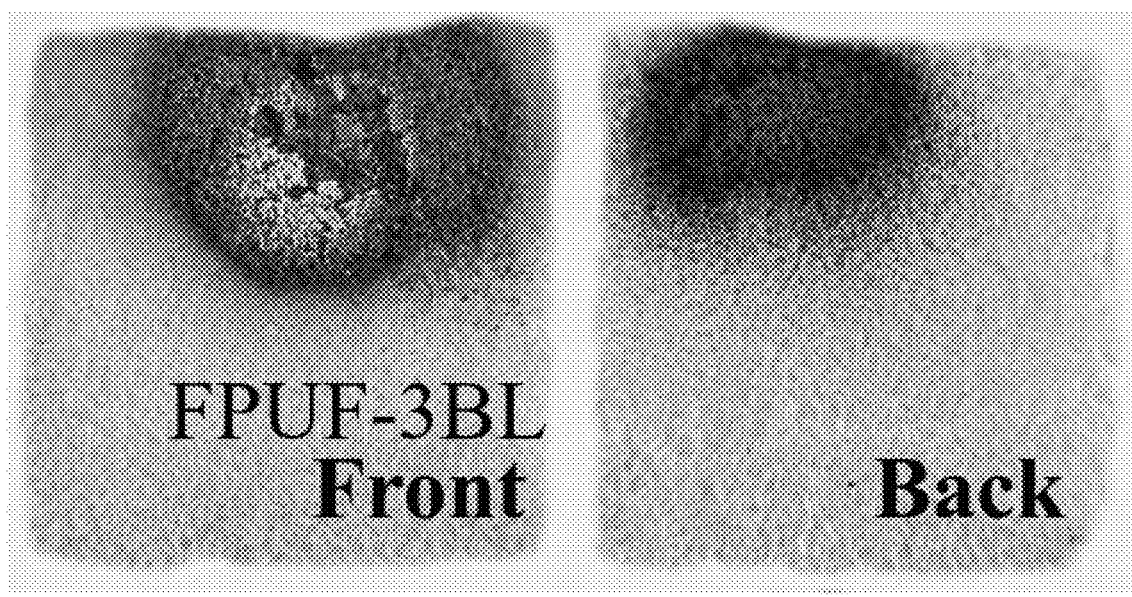
FIG. 11 shows physical pictures of the PUF containing a composite coating obtained in Comparative Example 1 after the temperature resistance test.

Physical pictures of the PUF containing a composite coating obtained in Example 1 after the temperature resistance test are shown in FIG. 10. Physical pictures of the PUF containing a composite coating obtained in Comparative Example 1 after the temperature resistance test are shown in FIG. 11. It can be seen from FIG. 10 and FIG. 11 that Example 1 and Comparative Example 1 are obviously different under the same butane torch burning. Example 1 had only slight burn through phenomenon, and the blue enamel generated on the surface at high temperature was conducive to flame retardancy and heat dissipation. For Comparative Example 1, it was burned through in large area, and its structure was also damaged.

Test Example 4

Figure 12:
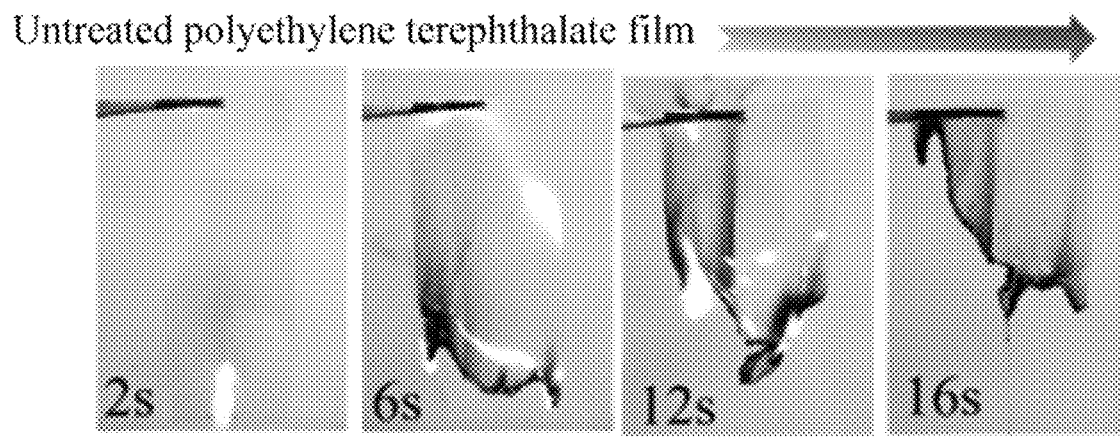
FIG. 12 shows vertical burning test results of a blank polyethylene terephthalate film.
Figure 13:
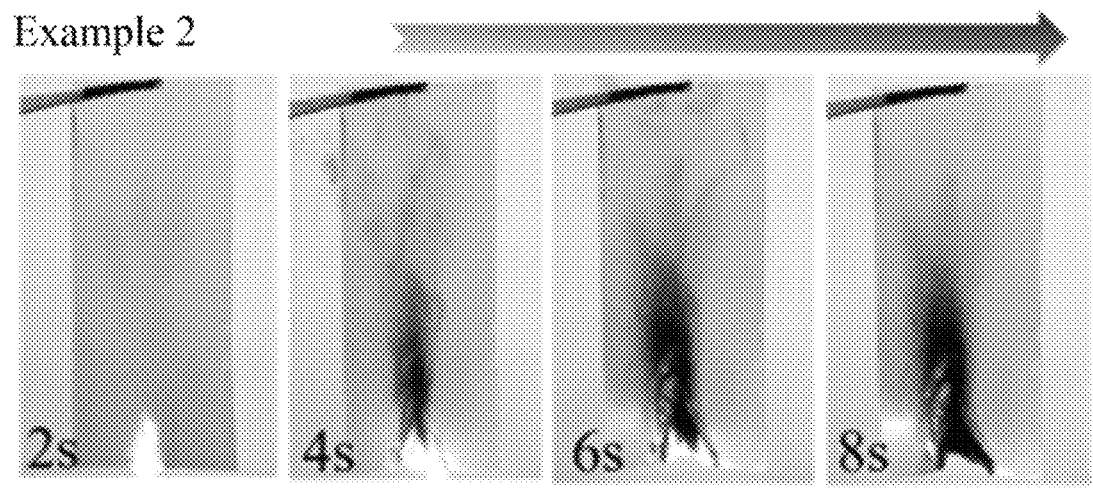
FIG. 13 shows vertical burning test results of a polyethylene terephthalate film containing a composite coating obtained in Example 2.

A vertical burning test was conducted on a polyethylene terephthalate film containing a composite coating obtained in Example 2 and a blank polyethylene terephthalate film according to the UL94 vertical burning standard. A test strip had a size of 120*13*10 mm. The ignition time was 2 s, and the test results are shown in FIG. 12 and FIG. 13. FIG. 12 shows the blank polyethylene terephthalate film, and FIG. 13 shows Example 2. It can be seen from FIG. 12 and FIG. 13 that the polyethylene terephthalate film containing a composite coating obtained in Example 2 self-extinguishes in 8 s without dripping, and the UL grade reaches V-0. Compared with the burning of the blank polyethylene terephthalate film, the flame-retardant effect is obvious.

Test Example 5

Figure 14:
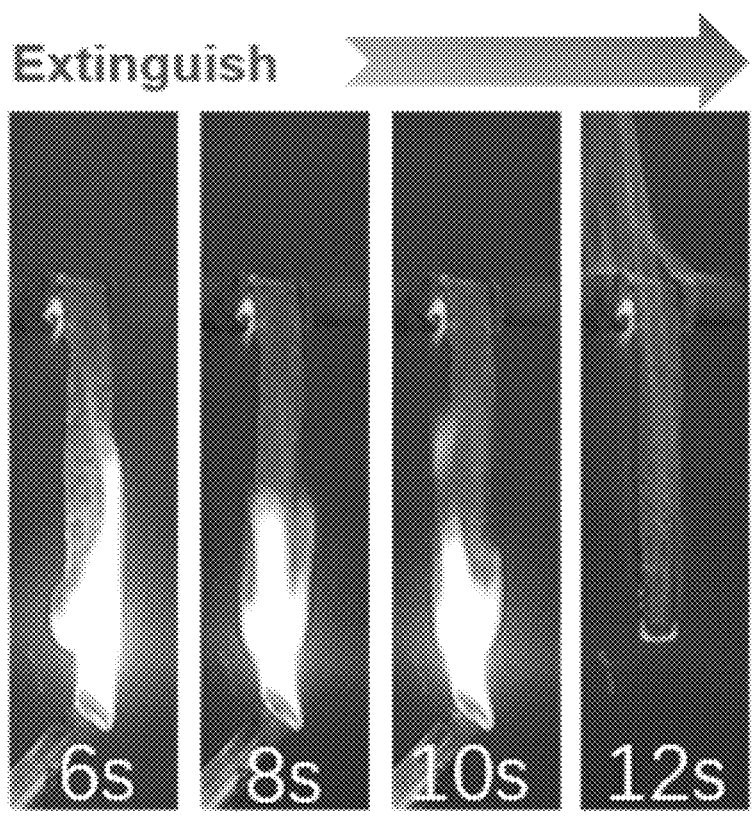
FIG. 14 shows vertical burning test images of PUF containing a composite coating obtained in Example 3.
Figure 15:
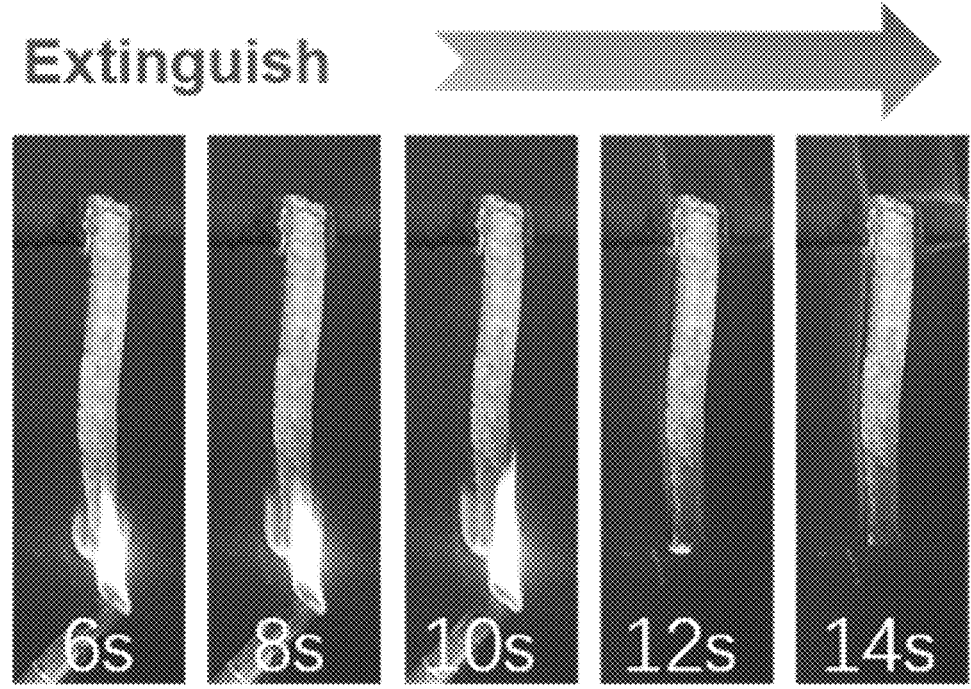
FIG. 15 shows vertical burning test images of PUF containing a composite coating obtained in Example 4.
Figure 16:
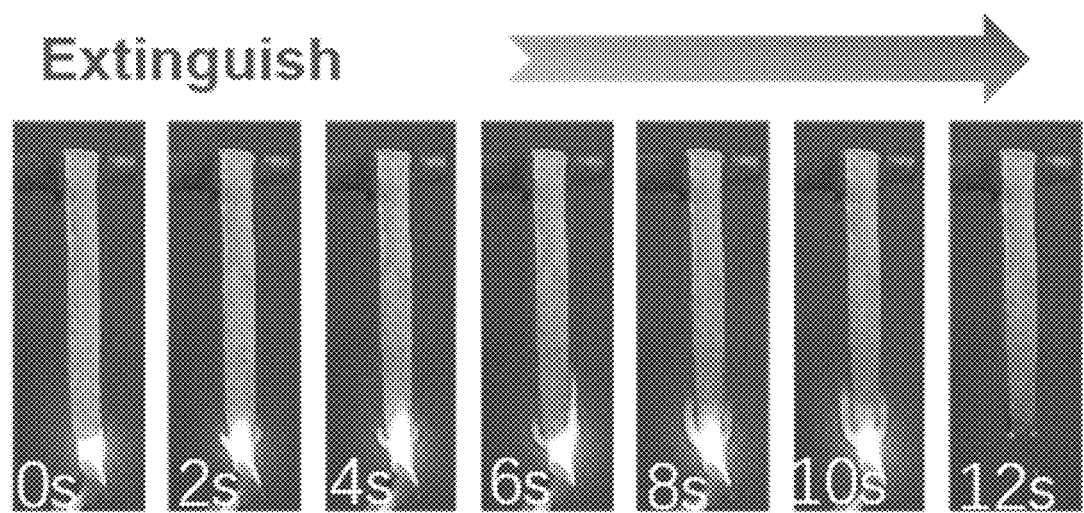
FIG. 16 shows vertical burning test images of PUF containing a composite coating obtained in Example 5.

A vertical burning test was conducted on PUF containing a composite coating obtained in Examples 3, 4, and 5 according to the UL94 vertical burning standard. A test strip had a size of 120*13*10 mm. The test results are shown in FIG. 14 to FIG. 16. FIG. 14 shows a sample corresponding to Example 3, which self-extinguishes after 12 s of burning.

FIG. 15 shows a sample corresponding to Example 4, which self-extinguishes after 14 s of burning.

FIG. 16 shows a sample corresponding to Example 5, which self-extinguishes after 12 s of burning.

It can be seen from FIG. 14 to FIG. 16 that the UL grade of the PUF containing a composite coating obtained by the present disclosure reaches V-0.

Although the above examples have described the present disclosure in a thorough manner, they are only some but not all examples of the present disclosure, and other examples may be obtained without inventive step according to the present examples, all of which fall within the scope of protection of the present disclosure.

What is claimed is:

1. A composite coating, comprising n unit coatings arranged in layers, wherein n≥1; and each of the unit coatings comprises a first coating and a second coating arranged in layers in sequence;
   the first coating and the second coating both comprise a water-soluble polymer compound;
   the water-soluble polymer compound comprises an electropositive water-soluble polymer compound or an electronegative water-soluble polymer compound;
   the water-soluble polymer compounds in the first coating and the second coating have opposite electrical properties; and
   the first coating and/or the second coating further comprise/comprises $M(OH)(OCH_3)$, wherein the M comprises one or more selected from the group consisting of Co, Ni, Fe, Mg, Al, and Zn.

2. The composite coating according to claim 1, wherein the electropositive water-soluble polymer compound comprises one or more selected from the group consisting of chitosan, starch, glucose, polyethyleneimine, monomethyl ether, and carboxymethyl chitosan.

3. The composite coating according to claim 1, wherein the electronegative water-soluble polymer compound comprises one or more selected from the group consisting of phosphate, phytate, alginate, lignosulfonate, polyethyleneimine, phytic acid, polyacrylic acid, and dodecyl benzene sulfonate.

4. The composite coating according to claim 1, wherein the $M(OH)(OCH_3)$ further comprises modified $M(OH)(OCH_3)$.

5. The composite coating according to claim 4, wherein the modified $M(OH)(OCH_3)$ comprises metal-organic framework modified $M(OH)(OCH_3)$ and melamine phosphate modified $M(OH)(OCH_3)$.

6. The composite coating according to claim 5, wherein the metal-organic framework modified $M(OH)(OCH_3)$ is dimethylimidazole cobalt modified $M(OH)(OCH_3)$.

7. The composite coating according to claim 6, wherein a preparation method of the dimethylimidazole cobalt modified $M(OH)(OCH_3)$ comprises the following steps:
   mixing cobalt nitrate hexahydrate, $M(OH)(OCH_3)$, 2-methylimidazole, and a polar solvent, and standing for aging to obtain the dimethylimidazole cobalt modified $M(OH)(OCH_3)$.

8. The composite coating according to claim 7, wherein the cobalt nitrate hexahydrate, the $M(OH)(OCH_3)$, and the 2-methylimidazole have a mass ratio of (1-6):(1-3):(1~8); and
   the cobalt nitrate hexahydrate in a mixed solution obtained by the mixing has a mass concentration of 1-20%.

9. The composite coating according to claim 7 or 8, wherein the standing for aging is conducted for 8-24 h at 25° C.

10. The composite coating according to claim 5, wherein a preparation method of the melamine phosphate modified $M(OH)(OCH_3)$ comprises the following step:
mixing melamine phosphate, $M(OH)(OCH_3)$, and water for a liquid phase reaction to obtain the melamine phosphate modified $M(OH)(OCH_3)$.

11. The composite coating according to claim 10, wherein the melamine phosphate and the $M(OH)(OCH_3)$ have a mass ratio of (1-20):(1-20); and
the $M(OH)(OCH_3)$ in a mixed solution obtained by the mixing has a mass concentration of 0.1-10%.

12. The composite coating according to claim 10 or 11, wherein the liquid phase reaction is conducted at 50-80° C. for 5-10 h.

13. The composite coating according to claim 1 or 4, wherein the $M(OH)(OCH_3)$ in the first coating has a mass percent of 0-5%;
the $M(OH)(OCH_3)$ in the second coating has a mass percent of 0-5%; and
the mass percent of the $M(OH)(OCH_3)$ in the first coating and the mass percent of the $M(OH)(OCH_3)$ in the second coating are not equal to 0 at the same time.

14. The composite coating according to claim 1, wherein when n=1, the first coating has a thickness of 0.2-1 μm, and the second coating has a thickness of 0.2-1 μm.

15. The composite coating according to claim 14, wherein when n≥2, the composite coating comprises a 1st unit coating and an n-th unit coating;
in the 1st unit coating, the first coating has a thickness of 0.2-1 μm, and the second coating has a thickness of 0.2-1 μm; and
in the n-th unit coating, the first coating has a thickness of 0.2-1 μm, and the second coating has a thickness of 0.2-1 μm.

16. A preparation method of the composite coating according to claim 1, comprising the following step:
alternately coating a first coating solution and a second coating solution on a surface of a substrate n times to obtain the composite coating, wherein n≥1;
the first coating solution and the second coating solution both comprise a water-soluble polymer compound;
the water-soluble polymer compound comprises an electropositive water-soluble polymer compound or an electronegative water-soluble polymer compound;
the water-soluble polymer compounds in the first coating solution and the second coating solution have opposite electrical properties; and
the first coating solution and/or the second coating solution further comprise/comprises $M(OH)(OCH_3)$, wherein the M comprises one or more selected from the group consisting of Co, Ni, Fe, Mg, Al, and Zn.

17. The preparation method according to claim 16, further comprising conducting pretreatment on the substrate prior to the coating, wherein
the pretreatment comprises electropositive or electronegative pretreatment.

18. The preparation method according to claim 17, wherein when the water-soluble polymer compound in the first coating solution is an electronegative aqueous solution polymer compound, the electropositive pretreatment is conducted; and
the electropositive pretreatment comprises the following steps:
immersing the substrate in an HNO3 solution with a mass concentration of 0.1% and water in sequence and drying to obtain a substrate subjected to the electropositive pretreatment.

19. The preparation method according to claim 17, wherein when the water-soluble polymer compound in the first coating solution is an electropositive aqueous solution polymer compound, the electronegative pretreatment is conducted; and
the electronegative pretreatment comprises the following steps:
placing the substrate in deionized water for ultrasonic treatment, placing the substrate subjected to the ultrasonic treatment in ethanol for primary immersion, and conducting primary drying; and
placing a substrate obtained after the primary drying in a polyethyleneimine solution for secondary immersion and conducting secondary drying, and placing the substrate in a polyacrylic acid solution for tertiary immersion and conducting tertiary drying to obtain a substrate subjected to the electronegative pretreatment;
or, placing the substrate obtained after the primary drying in a polyacrylic acid solution for secondary immersion and conducting secondary drying, and placing the substrate in a polyethyleneimine solution for tertiary immersion and conducting tertiary drying to obtain a substrate subjected to the electronegative pretreatment.

\* \* \* \* \*